US007254270B2

(12) United States Patent  
Simske

(10) Patent No.: US 7,254,270 B2
(45) Date of Patent: Aug. 7, 2007

(54) SYSTEM AND METHOD FOR BOUNDING AND CLASSIFYING REGIONS WITHIN A GRAPHICAL IMAGE

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1118 days.

(21) Appl. No.: 10/191,581

(22) Filed: Jul. 9, 2002

(65) Prior Publication Data

US 2004/0017941 A1 Jan. 29, 2004

(51) Int. Cl.
| | |
|---|---|
| G06K 9/62 | (2006.01) |
| G06K 9/34 | (2006.01) |
| G06K 9/46 | (2006.01) |
| G06K 9/52 | (2006.01) |
| G09G 5/00 | (2006.01) |
| H04N 1/387 | (2006.01) |
| H04N 1/40 | (2006.01) |

(52) U.S. Cl. .................. 382/224; 382/173; 382/190; 382/199; 382/206; 345/619; 345/631; 345/637; 345/667; 358/452; 358/453; 358/462

(58) Field of Classification Search ............... 345/619, 345/622, 631, 634–637, 667–671; 382/173, 382/175–176, 190, 195, 199, 203, 206, 224, 382/225, 227; 358/452, 453, 462, 464
See application file for complete search history.

(56) References Cited

U.S. PATENT DOCUMENTS

| 5,073,953 A * | 12/1991 | Westdijk ...................... 382/176 |
| 5,138,465 A * | 8/1992 | Ng et al. ...................... 358/453 |
| 5,159,667 A * | 10/1992 | Borrey et al. ................ 382/171 |
| 5,185,813 A * | 2/1993 | Tsujimoto .................... 382/180 |
| 5,303,342 A | 4/1994 | Edge ........................... 395/165 |
| 5,554,290 A | 9/1996 | Suthersan |
| 5,555,362 A * | 9/1996 | Yamashita et al. .......... 382/176 |
| 5,586,196 A * | 12/1996 | Sussman ...................... 382/114 |
| 5,596,655 A | 1/1997 | Lopez .......................... 382/173 |
| 5,625,711 A * | 4/1997 | Nicholson et al. .......... 382/224 |
| 5,767,978 A * | 6/1998 | Revankar et al. ........... 358/453 |
| 5,848,186 A * | 12/1998 | Wang et al. ................. 382/176 |
| 6,049,636 A | 4/2000 | Yang ........................... 382/289 |
| 6,151,426 A | 11/2000 | Lee et al. ..................... 382/319 |
| 6,263,122 B1 | 7/2001 | Simske et al. ............... 382/311 |
| 6,633,303 B2 * | 10/2003 | Nakajima .................... 345/629 |
| 6,973,213 B2 * | 12/2005 | Fan et al. .................... 382/176 |

FOREIGN PATENT DOCUMENTS

EP 0712089 A2 5/1996

(Continued)

OTHER PUBLICATIONS

Watanabe, et al., "Structure Recognition Methods for Various Types of Documents," Machine Vision and Applications, Sprinter-Veriag, 1993.

(Continued)

*Primary Examiner*—Bhavesh M Mehta
*Assistant Examiner*—Manav Seth

(57) ABSTRACT

A region bounding and classifying system utilizes memory and logic. The memory stores a set of image data that defines a graphical image. The logic is configured to identify a plurality of regions of different data types within the image and to bound each of the plurality of identified regions via a bounding region. The logic is configured to perform a prioritization of the data types included in the bounding region according to a predefined hierarchy of the data types. The logic is further configured to classify the bounding region based on the prioritization performed by the logic.

31 Claims, 6 Drawing Sheets

FOREIGN PATENT DOCUMENTS

JP          8161519          6/1996

OTHER PUBLICATIONS

Etemad, et al., "Multiscale Segmentation of Unstructured Document Pages Using Soft Decision Integration," IEEE Transactions on Pattern Analysis and Machine Intelligence, vol. 19, No. 1, Jan. 1997.

W. Scherl E. Hundt, "A Syntactic Method of Pattern Recognition for Document Processing," Siemens Forsch-u. Entwick.-Ber. Bd. 13 (1984) Nr. 3, Springer-Verag, 1984.

Friedrich M. Wahl, Kwan Y. Wong, and Richard G. Casey, Block Segmentation and Text Extration in Mixed Text/Image Documents, Computer Graphics and Image Processing 20, 1982, at 375-390.

United States Patent & Trademark Office, Search Report under Section 17, Nov. 19, 2003 for Application No. GB 0315294.9.

* cited by examiner

SYSTEM AND METHOD FOR BOUNDING AND CLASSIFYING REGIONS WITHIN A GRAPHICAL IMAGE

BACKGROUND OF THE INVENTION

1. Field of the Invention

The present invention generally relates to image processing techniques and, in particular, to a system and method for bounding and classifying regions within a graphical image.

2. Related Art

Scanners are typically utilized to capture and reproduce digital images of objects, such as documents, for example. In scanning an object, a scanner electronically reads the surface of the object and produces digital data defining an image of the scanned surface. This digital data may then be rendered to produce an image of the scanned surface.

A document page often includes regions of different data types, and it may be desirable for the regions of different data types to be differently processed. For example, a scanned document page may include a textual region and a drawing region, and it may be desirable to employ optical character recognition (OCR) techniques to reproduce the textual region and to employ other types of techniques to reproduce the drawing region.

Thus, some scanning systems are designed to analyze the data defining a scanned image and to identify and classify various regions within the image in a process commonly referred to as "zoning analysis." In performing zoning analysis, regions within an image are typically classified into one of the following general data types: "photograph," "drawing," "table," and "text." Sometimes the "drawing" data type is further divided into various classes, such as drawings of single-bit depth, referred to herein as "single-bit drawings," and drawings of multi-bit depth, referred to herein as "multi-bit drawings."

After the different regions within the scanned image are classified, the regions may be processed according to their classification. For example, "photograph" regions may be processed with very high resolution and bit depth techniques, and "drawing" regions may be processed with lower resolution and bit depth techniques. Furthermore, "text" regions may be processed with OCR techniques, and "table" regions may be processed with a combination of OCR techniques for reproducing the textual information of one or more tables and drawing techniques for reproducing the non-textual information of the one or more tables.

After identifying and classifying different regions of a scanned image, a user may manipulate one or more of the regions via a destination application (e.g., Word™, Adobe Acrobat™, etc.) capable of processing graphical images. However, utilizing a destination application to display various regions identified and classified by typical zoning analysis processes can be problematic. For example, when interfacing the regions of a scanned image with a destination application, each region identified and classified by a zoning analysis process is often encapsulated by a different bounding box, which is moved to the destination application and then displayed. Depending on the locations of the various regions with respect to each other, it is possible for the bounding boxes of various regions to overlap even though the regions themselves do not, thereby causing various display problems or quality issues for the destination application.

There are various other problems that may surface when utilizing conventional destination applications to display regions identified and classified by typical zoning analysis processes. These problems can degrade the images produced by the destination applications and/or complicate the process of displaying the images.

SUMMARY OF THE INVENTION

Generally, the present invention provides a system and method for bounding and classifying regions within a graphical image.

A region bounding and classifying system in accordance with an exemplary embodiment of the present invention utilizes memory and logic. The memory stores a set of image data that defines a graphical image. The logic is configured to identify a plurality of regions of different data types within the image and to bound each of the plurality of identified regions via a bounding region. The logic is configured to perform a prioritization of the data types included in the bounding region according to a predefined hierarchy of the data types. The logic is further configured to classify the bounding region based on the prioritization performed by the logic.

The present invention can also be viewed as providing a region bounding and classifying method. An exemplary embodiment of the method can be broadly conceptualized by identifying a plurality of regions of different data types within a graphical image defined by a set of image data, bounding each of the plurality of identified regions via a bounding region, identifying which data types are included in the bounding region, selecting one of the identified data types based on a predefined hierarchy of the data types, and assigning the one data type to the bounding region based on the selecting.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally pertains to a system for performing various processing on digital data defining a graphical image in order to facilitate editing or manipulation of the graphical image. In a preferred embodiment, an image analyzer performs zoning analysis on the digital data of a scanned image in order to identify various regions of different types within the image. If desired, the image analyzer then bounds multiple regions into one bounding region and classifies the one bounding region based on the data types of the bound regions. In order to better classify the bounding region, the classification of the bounding region may be based on a priority scheme and/or a statistical analysis according to techniques that will be generally described in more detail hereafter. Moreover, the bounding of multiple regions by a bounding region can make it easier for a user to manipulate portions of the scanned image and/or to interface the digital data of the scanned image with various known destination applications, such as, for example, image editors, web servers, document management programs, etc.

Figure 1:
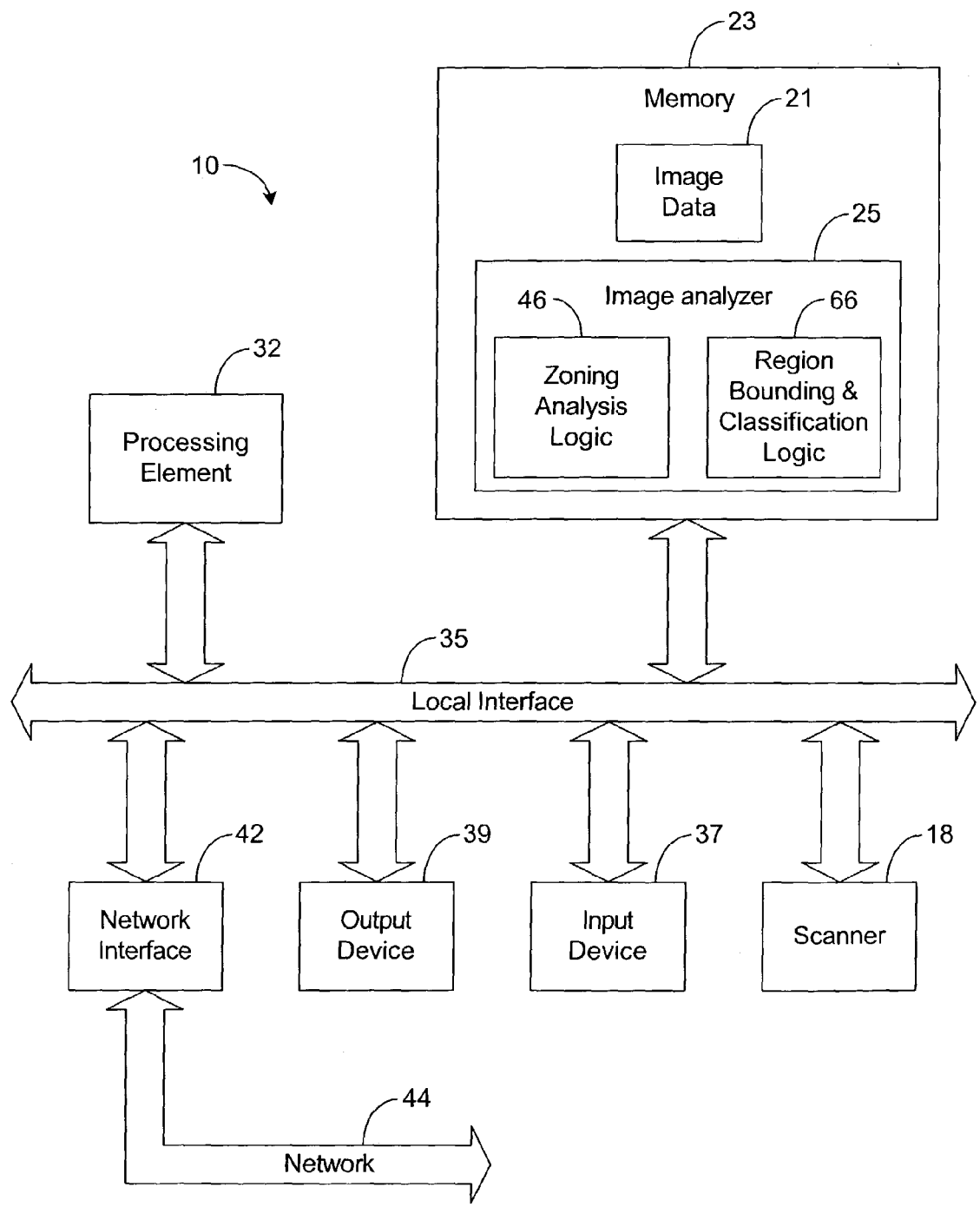
FIG. 1 is a block diagram illustrating a processing system in accordance with an exemplary embodiment of the present invention.

A region bounding and classification system 10 in accordance with a preferred embodiment of the present invention is depicted in FIG. 1. As shown by FIG. 1, the system 10 includes a scanner 18 that captures an image of an object, such as a document, for example, according to techniques well-known in the art. In capturing such an image, the scanner 18 produces image data 21 that defines the captured image and that is stored within memory 23 of the system 10. Note that it is possible for the image data 21 to be derived from other sources other than the scanner 18. For example, it is possible for the image data 21 to be downloaded from an external system or device (not shown).

After the image data 21 is stored in memory 23, an image analyzer 25 preferably analyzes and processes the image data 21 according to techniques that will be described in more detail hereafter. The image analyzer 25 can be implemented in software, hardware, or a combination thereof. In the preferred embodiment, as illustrated by way of example in FIG. 1, the image analyzer 25, along with its associated methodology, is implemented in software and stored in the memory 23 of the system 10.

Note that the image analyzer 25, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport a program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the image analyzer 25 may be magnetically stored and transported on a conventional portable computer diskette.

The preferred embodiment of the scanning system 10 of FIG. 1 comprises one or more conventional processing elements 32, such as a digital signal processor (DSP) or a central processing unit (CPU), that communicate to and drive the other elements within the system 10 via a local interface 35, which can include one or more buses. Furthermore, an input device 37, for example, a keyboard or a mouse, can be used to input data from a user of the system 10, and an output device 39, for example, a screen display or a printer, can be used to output data to the user. The system 10 can be connected to a network interface 42 that allows the system 10 to exchange data with a network 44.

In the preferred embodiment, zoning analysis logic 46 within the image analyzer 25 performs zoning analysis on the image data 21. Zoning analysis is a known process by which a graphical image is divided into various regions that are classified based on the type of information included in the various regions. For example, a region of textual information may be identified and classified as a "text" region, whereas a region of drawing information may be identified and classified as a "drawing" region. For more information describing techniques that may be employed to perform zoning analysis, refer to U.S. Pat. Nos. 6,263,122; 6,151,426; and 5,596,655, which are all incorporated herein by reference.

The zoning analysis performed by zoning analysis logic 46 preferably divides the image defined by image data 21 into regions of various types. For illustrative purposes, assume that the zoning analysis logic 46 is configured to classify each region as one of the following data types: "photograph," "multi-bit drawing," "single-bit drawing," "table," and "text."

Figure 2:
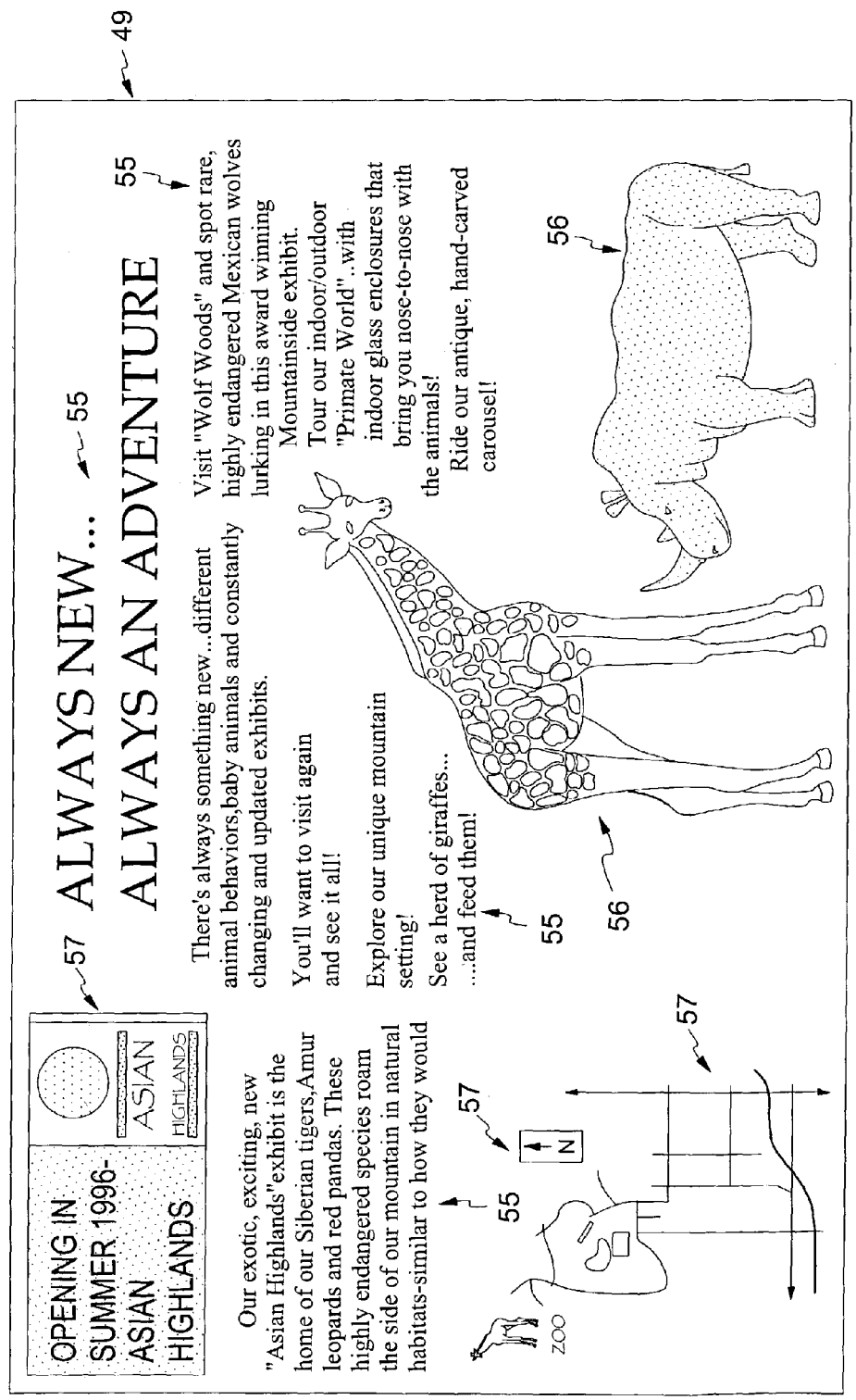
FIG. 2 is a diagram illustrating an image defined by scan data depicted in FIG. 1.

To better illustrate the zoning analysis process performed by the zoning analysis logic 46, assume that the image data 21 defines an image 49 depicted in FIG. 2. Note that the image 49 of FIG. 2 may be displayed, for example, by rendering the image data 21 to the output device 39.

Figure 3:
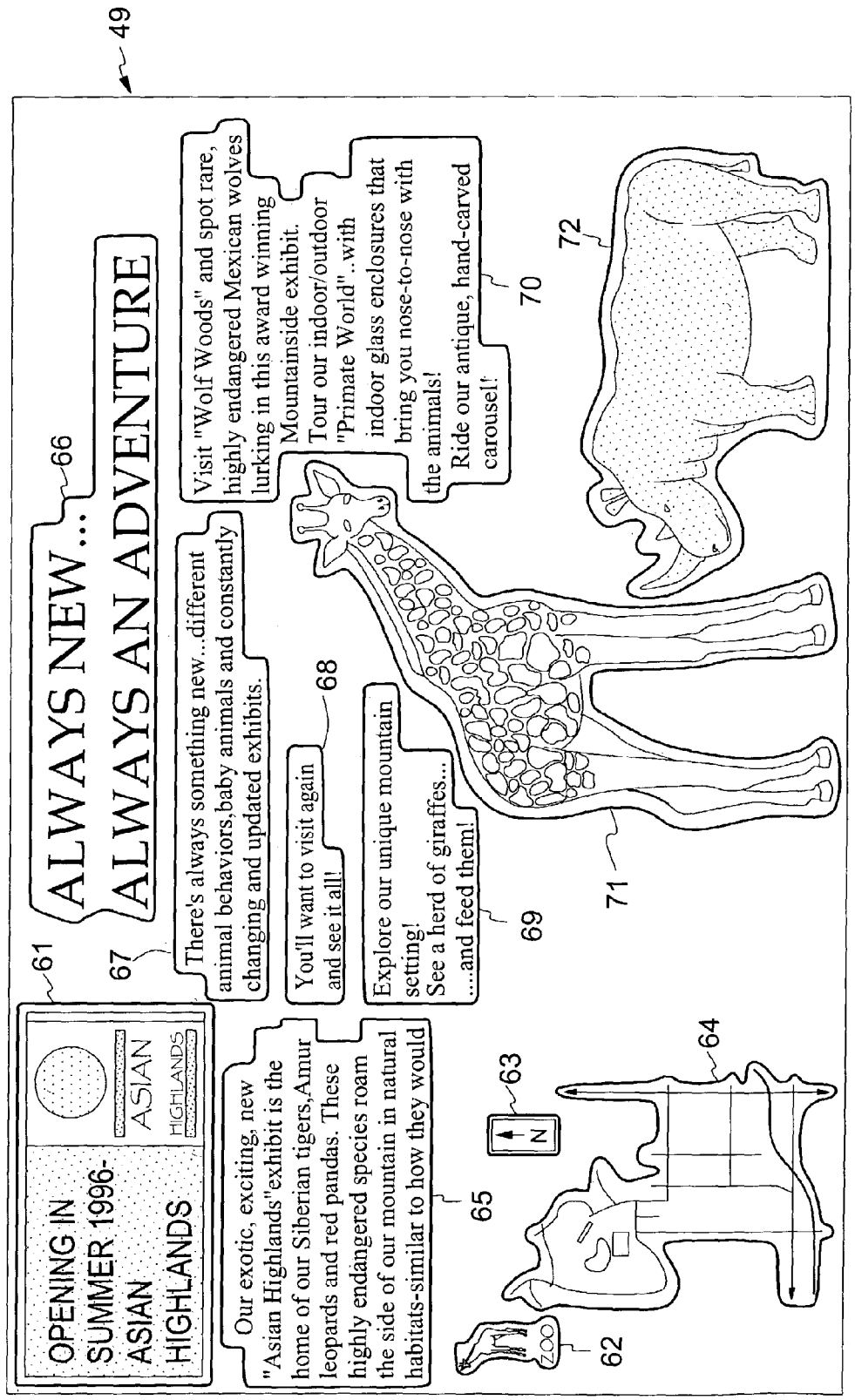
FIG. 3 is a diagram illustrating the image of FIG. 2 after zoning analysis logic within the system of FIG. 1 has divided the image into various regions.

As shown by FIG. 2, the image 49 includes various textual information 55, various photographs 56, and various drawing information 57. Thus, the zoning analysis logic 46 may divide the image 49 into various regions 61-72 (FIG. 3), in which regions 61 and 62 are classified as "multi-bit drawing" regions, regions 63 and 64 are classified as "single-bit drawing" regions, regions 65-70 are classified as "text" regions, and regions 71 and 72 are classified as "photograph" regions. Note that, as shown by FIG. 3, borders may be displayed around each identified region 61-72 within the image 49.

It may be desirable to have one or more of the regions 61-72 bound via a single bounding region. For example, the user may like the overall layout of regions 67-72 and desire to move such regions to a destination application (not shown), such as an image editor, for example, to perform various editing on the moved regions 67-72. This may be facilitated if one or more such regions 67-72 is bound by a single bounding region.

In this regard, when multiple regions 67-72 are bound via a single bounding region, each of the bound regions 67-72 may be affected by a single manipulation of the bounding region, thereby reducing the number of overall regions that are individually manipulated. Therefore, bounding regions 67-72 via a single bounding region helps to maintain the overall look of the regions 67-72 as shown in FIG. 2. Furthermore, many destination applications process graphical data better when the graphical data is defined by bounding boxes. Indeed, some destination applications, particularly image editors, receive external graphical data only in the form of content-filled bounding boxes. Thus, it may be desirable to have the image 49 divided into rectangular bounding boxes rather than irregularly shaped regions, such as the regions 61-72 shown by FIG. 3.

Moreover, after zoning analysis is performed on the image data 21, region bounding and classification logic 66 within the image analyzer 25 preferably bounds one or more of the regions 61-72 previously identified by the zoning analysis logic 46. In this regard, the region bounding and classification logic 66 analyzes the image data 21 to determine which combinations of regions 61-72 may fit within a single bounding region. The region bounding and classification logic 66 then divides the image 49 into various bounding regions. The bounding regions are preferably defined such that each bounding region only includes regions 61-72 that wholly fit within the bounding region. Furthermore, in the preferred embodiment, each bounding region formed by the region bounding and classification logic 66 is a bounding box, although other shapes of bounding regions may be employed in other embodiments, if desired.

Figure 4:
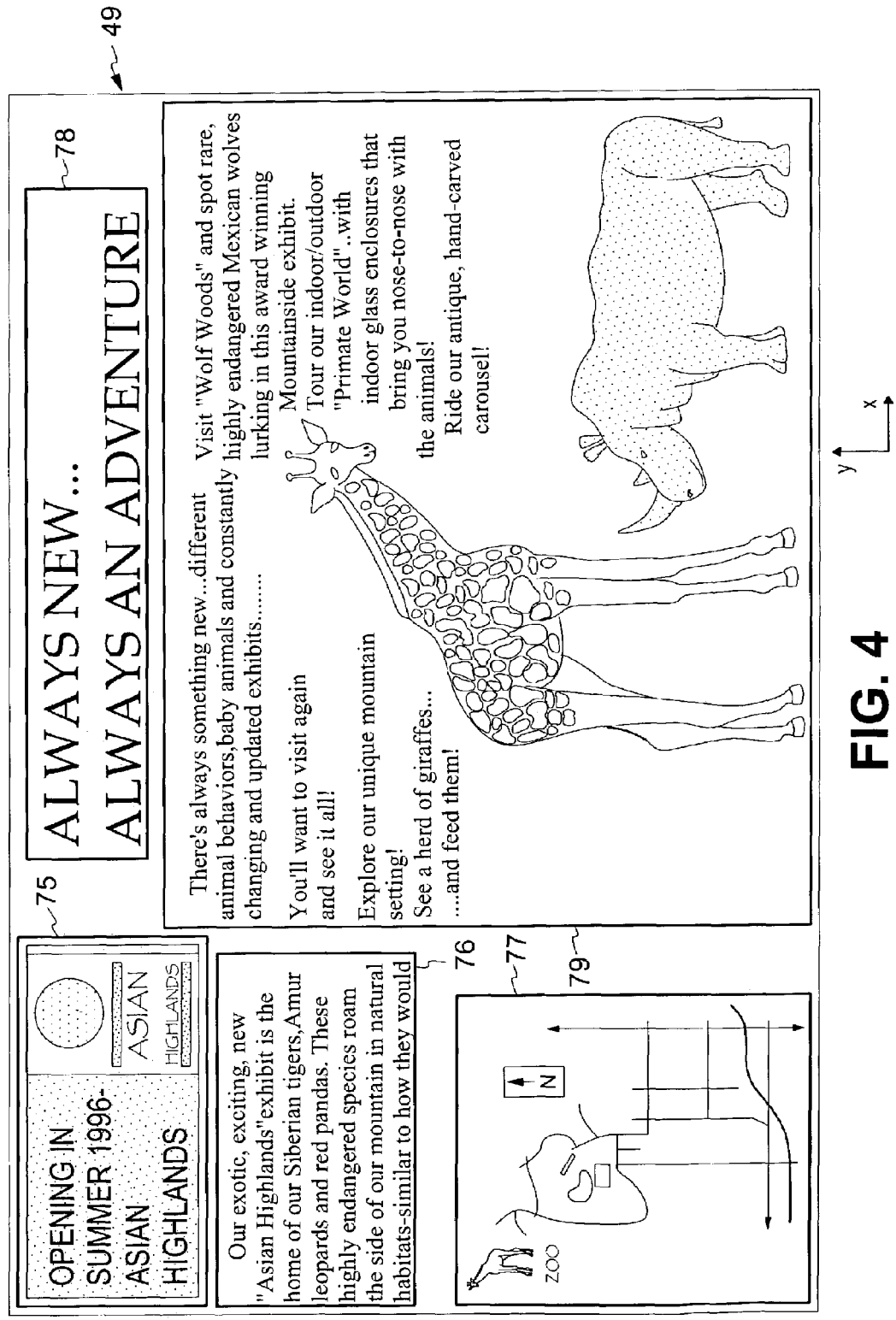
FIG. 4 is a diagram illustrating the image of FIG. 3 after bounding and classification logic within the system of FIG. 1 has divided the image into various bounding regions.

As an example, the region bounding and classification logic 66 may divide the image 49 into five bounding boxes 75-79, as shown by FIG. 4. Referring to FIGS. 3 and 4, bounding box 75 includes region 61, which wholly fits within bounding box 75, and bounding box 76 includes region 65, which wholly fits within bounding box 76. Furthermore, bounding box 77 includes regions 62-64, which wholly fit within bounding box 77, and bounding box 78 includes region 66, which wholly fits within bounding box 78. Also, bounding box 79 includes regions 67-72, which wholly fit within bounding box 79.

Each bounding box 75-79 includes two horizontal sides that extend in a direction parallel to the x-direction and two vertical sides that extend in a direction parallel to the y-direction. In the preferred embodiment, the bounding boxes 75-79 are iteratively formed, although one or more bounding boxes 75-79 may be concurrently formed in other embodiments. In forming the bounding boxes 75-79, each bounding box 75-79 is preferably set to an initial size in a region not encompassed by a previous bounding box 75-79. Then, the bounding box 75-79 is expanded by moving the sides of the bounding box 75-79 until each side fails to intersect with any of the regions 61-72 previously identified by the zoning analysis logic 46.

As an example, in forming bounding box 79, a smaller form of the bounding box 79 may be initially positioned over one of the regions 67-72. In such a case, each side of the bounding box 79 is preferably moved by the region bounding and classification logic 66 until it no longer intersects with any of the regions 67-72. In this regard, each vertical side is moved in a direction parallel to the x-direction such that the overall area of the bounding box 79 increases, and each horizontal side is moved in a direction parallel to the y-direction such that the overall area of the bounding box 79 increases. By following the foregoing procedure, the bounding box 79 expands until it wholly encompasses regions 67-72, as shown by FIG. 4. Each of the other bounding boxes 75-78 may be formed via similar techniques. Note that the region bounding and classification logic 66 continues to form new bounding boxes until all of the regions 61-72 identified by the zoning analysis logic 46 are encompassed within a bounding box.

Once a bounding box 75-79 is formed by the region bounding and classification logic 66, the region bounding and classification logic 66 preferably classifies or, in other words, assigns a data type to the bounding box 75-79 based on the types of regions 61-72 encompassed by it. Future processing and displaying of the image defined by a particular bounding box 75-79 are preferably performed utilizing techniques associated with the data type assigned to the particular bounding box 75-79.

In classifying a bounding box 75-79, the region bounding and classification logic 66 preferably adheres generally to a predefined hierarchical classification scheme or "hierarchy." In this regard, the data types are preferably ranked by a predefined hierarchy in an order such that any region assigned a lower rank can be processed according to, processing techniques associated with any region of higher rank without significantly and adversely affecting the display of information within the lower ranking region.

As an example, it is generally well-known that techniques commonly employed to process and display photographic images may be used to process and display textual information without significantly and adversely affecting the display of the textual information. Although such photographic processing techniques do not usually employ OCR, the photographic processing techniques define an image that maintains the look of the textual information when displayed by image processing applications. However, utilizing such photographic processing techniques "over processes" the textual information. More specifically, such techniques utilize more memory space and/or processing power to process the textual information than would otherwise be required if normal textual processing techniques (e.g., OCR) were used to process the textual data. Nevertheless, it is possible to successfully process textual information utilizing photographic processing techniques.

However, processing techniques (e.g., OCR) commonly employed to process and display textual information cannot generally be successfully used to process photographic information without significantly and adversely affecting the display of the photographic information. In this regard, such textual processing techniques are either incompatible with photographic data or of such a low resolution or quality that the resulting image is significantly distorted or discolored. As an example, OCR techniques generally convert photographic information into alphanumeric characters, which represent an inappropriate rendering of the photographic data. Therefore, according to the classification scheme set forth herein, "photograph" regions preferably have a higher rank than "text" regions in the preferred embodiment of the present invention. Indeed, in the preferred embodiment, the data types are preferably ranked from highest to lowest according to the following sequence: "photograph," "multi-bit drawing," "single-bit drawing," "table," and "text."

Moreover, the region bounding and classification logic 66, in classifying a bounding box 75-79, preferably identifies each data type encompassed by the bounding box 75-79. Generally, the highest ranking data type of any region 61-72 within the bounding box 75-79 is assigned to the bounding box 75-79. For example, the bounding box 79 of FIG. 4 includes regions 71 and 72 classified as "photograph," which is the highest ranking data type. Thus, the bounding box 79 is preferably classified as "photograph" unless the "photograph" data type is disqualified for the bounding box 79 according to techniques that will be described in more detail hereafter. Note that the bounding box 79 is preferably classified as "photograph" even though the bounding box 79 includes data types of a lower rank.

Bounding box 77, on the other hand, includes no regions classified as "photograph." Indeed, the highest ranking data type within the bounding box 77 is "multi-bit drawing." Thus, provided that the "multi-bit drawing" data type is not disqualified for the bounding box 77 according to techniques described in more detail hereafter, the bounding box 77 is preferably classified as a "multi-bit drawing" even though the bounding box 73 includes data types of a lower rank.

In some situations, the highest ranking data type within a bounding box 75-79 may form an insignificant portion of the bounding box 75-79. In such a case, it may be desirable to disqualify the highest ranking data type from the classification of the bounding box 75-79 such that the bounding box 75-79 may be assigned a lower ranking data type.

For example, refer to bounding box 77 of FIG. 4. As can be seen by comparing FIGS. 3 and 4, the bounding box 77 includes the region 62, which is assigned a higher priority data type (i.e., "multi-bit drawing") than the other regions 63 and 64 within the bounding box 77. However, region 62 occupies only a small portion of the bounding box 77, and regions 63 and 64 occupy a much larger portion of the bounding box 77. In such an example, it may be desirable to assign a lower ranking data type (e.g., the data type of region 64) to the bounding box 77.

In this regard, since region 62 appears to be a relatively insignificant portion of the overall image defined by bounding box 77, any adverse effects to the region 62 caused by assigning a lower ranking data type to the box 77 may be relatively minor. However, since region 64 appears to be a relatively significant portion of the overall image defined by bounding box 77, significant efficiency benefits may be realized by assigning bounding box 77 the lower ranking data type of region 64 instead of the higher ranking data type of region 62. In particular, processing the region 64 via processing techniques associated with the lower ranking data type may reduce "over processing" of the data defining the region 64. Furthermore, the aforementioned efficiency benefits may outweigh the aforementioned adverse effects associated with assigning bounding box 77 the lower ranking data type of region 64.

To determine whether one or more data types for a particular bounding box 75-79 should be disqualified, the region bounding and classification logic 66 preferably determines a priority value for each data type within the particular bounding box 75-79. The priority value for a data type is preferably weighted based on the amount of energy devoted to the data type within the particular bounding box 75-79. After calculating the priority values for each data type within the particular box 75-79, the priority values are compared, and one or more data types can be disqualified based on the comparisons.

Note that the amount of energy devoted to a particular data type for a particular region generally pertains to a statistic or probability as to how much of the information within the particular region is conducive to the processing techniques associated with the particular data type. Generally, the more likely that the information within the particular region is conducive to the processing techniques associated with the particular data type instead of the processing techniques associated with other data types, the higher the energy level for the particular data type.

Further note that there are various methodologies that may be employed for determining the priority values of data types within a particular box 75-79 and for comparing the priority values in order to determine whether one or more such data types should be disqualified. In the preferred embodiment, the priority values are calculated and compared according to techniques that will now be described in more detail.

Figure 5:
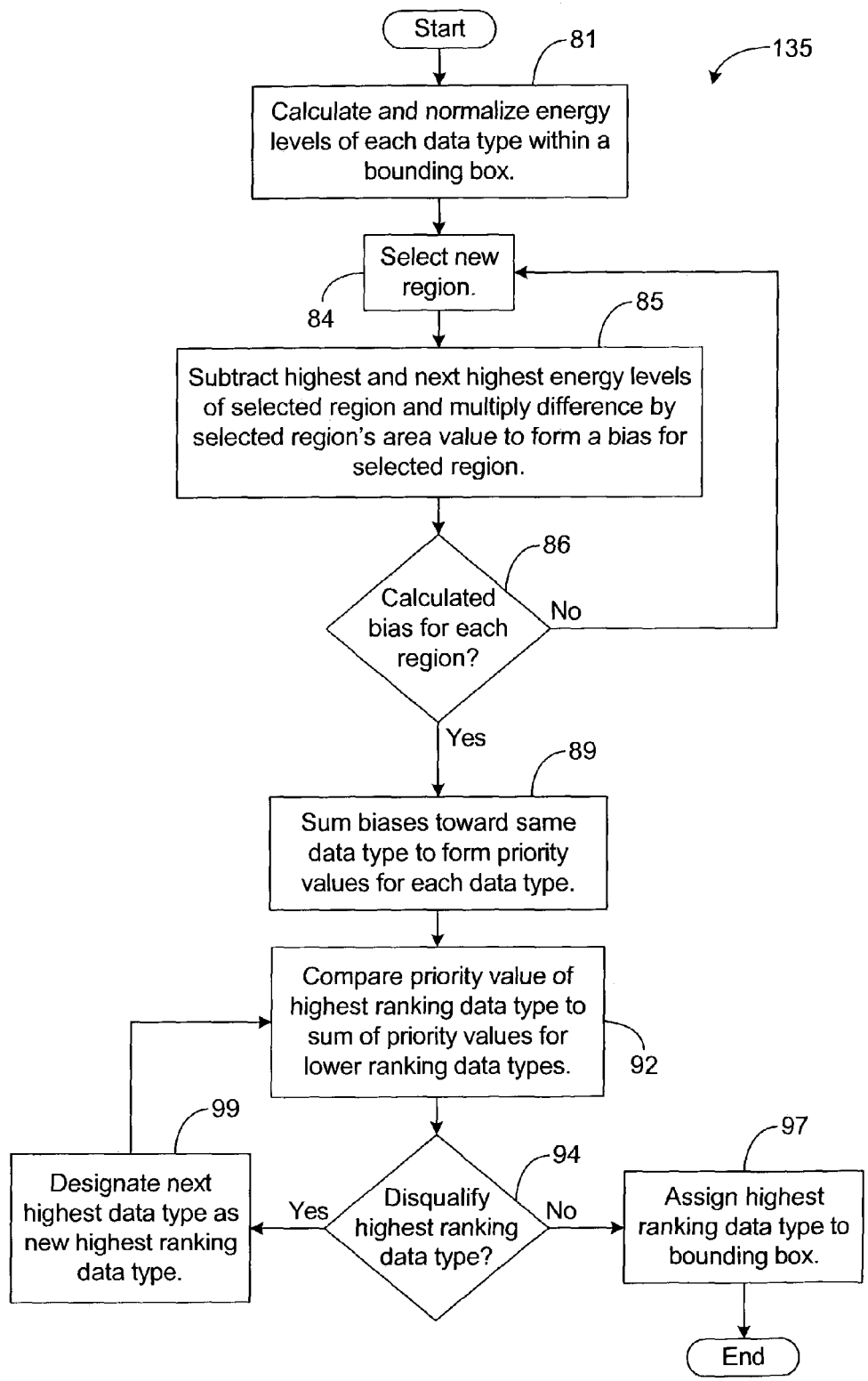
FIG. 5 is a flowchart illustrating an exemplary process for classifying a bounding region depicted in FIG. 4.

Initially, the energy levels for each data type are calculated for each region 61-72 within the particular bounding box 75-79, as shown by block 81 of FIG. 5. For each such region 61-72, the energy levels of each data type are normalized such that their sum equals one. Then, as shown by blocks 84-86, for each region 61-72 within the particular box 75-79, the highest energy level and the next highest energy level are subtracted, and the difference is then multiplied by a value indicative of the region's area in order to derive a value, referred to as a "bias" toward the data type of the highest energy level; This bias may be generally viewed as a normalized estimation, taking into account the size of the region, of the "quality loss" incurred by retyping the region from the data type of the highest energy level to the data type of the next highest energy level. Various other techniques can be employed for determining the foregoing bias.

After calculating the biases for each of the regions 61-72 within the particular box 75-79, the biases toward the same data type are summed to form an overall bias, or "priority value," for the data type, as shown by block 89 of FIG. 5. The overall bias or priority value for a data type is generally a measure of the extent, relative to the other data types, to which information of the data type is included within the particular box 75-79. In other words, the priority value for a data type indicates the overall significance of the data type to the particular box 75-79. Note that other methodologies for determining an overall significance of a data type to the particular box 75-79 may be employed in other embodiments.

After calculating the priority values, the priority values for the different data types are compared, as depicted by block 92. In this regard, if the foregoing priority value sum exceeds the priority value for the highest ranking data type by a predefined factor, then the highest ranking data type is disqualified in block 94 of FIG. 5. Note that the predefined factor should be selected such that, if exceeded, the amount of energy devoted to the highest ranking data type is so insignificant as compared to the amount of energy devoted to the lower ranking data types that it would be desirable to assign the particular box 75-79 the data type of a lower ranking data type.

As an example, it may be desirable to disqualify the highest ranking data type if the sum of the priority values for all of the lower ranking data types is 500 times greater than the priority value of the highest ranking data type. In such an example, the bounding and classification logic 66 may calculate a threshold, referred to as a "bias threshold," that is equal to 500 times the priority value of the highest ranking data type. If the sum of the priority values for the lower ranking data types is greater than the bias threshold, then the highest ranking data type is disqualified. If not, then the highest ranking data type is not disqualified.

Note that other types of factors and/or thresholds may be utilized in other embodiments for determining disqualification. Indeed, the bias threshold is generally a trade-off between presentation quality and presentation efficiency. In this regard, higher presentation quality is generally ensured via a higher bias threshold. However, a higher bias threshold generally increases the amount of processing and storage utilized to define and render the bounding regions 75-79 being manipulated by the system 10.

Moreover, if the highest ranking data type is not disqualified, then the bounding and classification logic 66 assigns the highest ranking data type to the particular bounding box 75-79, as shown in block 97 of FIG. 5. If the highest ranking data type is disqualified, then the bounding and classification logic 66 designates the next highest ranking data type as the highest ranking data type in block 99, and the foregoing process of summing the priority values of the lower ranking data types and comparing this sum to the priority value of the highest ranking data type is repeated until one of the data types, when treated as the highest ranking data type, is not disqualified.

As an example, assume that the normalized energy levels for the regions 62-64 (FIG. 3) within the bounding box 77 are determined according to Table A below.

TABLE A

|  | Region 62 | Region 63 | Region 64 |
|---|---|---|---|
| Photograph | 0 | 0 | 0 |
| Multi-bit Drawing | .39 | .3 | .1 |
| Single-bit Drawing | .31 | .5 | .8 |
| Table | 0 | 0 | 0 |
| Text | .3 | .2 | .1 |

Also assume that region 63 is 80% the size of region 62 and that region 64 is 100 times the size of region 62. In this example, region 62 may be assigned an area value of 1, and regions 63 and 64 may be assigned area values of 0.8 and 100, respectively.

In the present example, the highest ranking data type "photograph" can be immediately disqualified since the energy levels for this data type are all zero, as shown above in Table A. Thus, the data type "multi-bit drawing" preferably becomes the highest ranking data type for the purposes of the present analysis.

To determine which data type to assign to the box 77, the next highest energy level, for each region 62-64 within the bounding box 77, is preferably subtracted from the region's highest energy level. Note that the highest energy level for each region 62-64 is bolded and underlined in Table A above.

Thus, for region 62, the next highest energy level (0.31) is subtracted from the highest energy level (0.39) to yield a difference of (0.08.) This difference (0.08) is then multiplied by the area value (1) associated with the region 62 to yield a product of 0.08. This product (0.08) represents the bias of region 62 toward data type "multi-bit drawing."

For region 63, the next highest energy level (0.3) is subtracted from the highest energy level (0.5) to yield a difference of 0.2. This difference (0.2) is then multiplied by the area value (0.8) associated with the region 63 to yield a product of 0.16. This product (0.16) represents the bias of region 63 toward data type "single-bit drawing."

For region 64, the next highest energy level (0.1) is subtracted from the highest energy level (0.8) to yield a difference of 0.7. This difference (0.7) is then multiplied by the area value (100) associated with the region 64 to yield a product of 70. This product (70) represents the bias of region 64 toward data type "single-bit drawing."

After calculating the biases of the regions 62-64 within the bounding box 77, the biases associated with the same data types are summed to form the overall biases or "priority values" for the data types. Note that there are only three biases in the present example. Region 62 is the only region having a bias toward "multi-bit drawing." Thus, the overall bias or priority value for "multi-bit drawing" is the bias calculated for region 62 or, in other words, is 0.08. Furthermore, both regions 63 and 64 are biased toward "single-bit drawing." Thus, the overall bias toward "single-bit drawing" is the sum of the biases calculated for regions 63 and 64 or, in other words, is 70.16. Note that the remaining data types (i.e., "photograph," "table," and "text") have zero (0) as their respective priority value.

After calculating the priority values for each of the data types, the priority value calculated for the highest ranking data type (i.e., "multi-bit drawing") is subtracted from the sum of the priority values calculated for the lower ranking data types. Since the priority values for all of the data types ranked below "single-bit drawing" are zero (0), the foregoing sum, which is referred to hereafter is the "overall bias sum," is equal to the priority value of "single-bit drawing" or, in other words, is equal to 70.16.

Assume that the bias threshold in the present example is selected to be a factor of 500 times the priority value of the highest ranking data type. Thus, the bias threshold in the present example is established as 40 (i.e., 500×0.08). Since the overall bias sum (70.16) is greater than the bias threshold (40), the highest ranking data type ("multi-bit drawing") is disqualified. Thus, the next highest ranking data type ("single-bit drawing") is designated as the highest ranking data type, and the process of comparing overall data types is repeated. Note that since a new data type is established as the highest ranking data type, the bias threshold is changed. In the present example, the bias threshold is changed to 35080 (i.e., 500×70.16).

In this example, there is no overall bias for the lower ranking data types once data type "single-bit drawing" is designated as the highest ranking region of type. As a result, the overall bias sum for the lower ranking data types is zero (0) and, therefore, does not exceed the current bias threshold. As a result, the highest ranking data type ("single-bit drawing") is not disqualified, and the bounding and classification logic 66 assigns bounding box 77 data type "single-bit drawing."

Note that the foregoing statistical analysis for determining whether data types should be disqualified has been described herein for illustrative purposes. There are a variety of other types of statistical analysis that may be performed on the energy levels of different data types in order to determine whether or not a particular data type should be disqualified for a particular box 75-79.

In addition, the preferred embodiment of the present invention has been described above as operating on non-overlapping regions 61-72. However, it is not necessary for the regions operated on by the image analyzer 25 to be non-overlapping. For example, it is possible for an image of a table (not shown) to be assigned one type and for the text regions within the table to be assigned a different type. The techniques described above may be utilized to bound the table, including perhaps other regions outside of the table, via a bounding region and to assign a data type to the bounding region. In such an example, the logic 66 may the analyze two overlapping regions (e.g., the table and the text region within the table) in the same way that the logic analyzes two non-overlapping regions, as described above in the preferred embodiment.

Note further that overlapping regions may be generated by performing different zoning analysis processes on the same image 49. For example, a first set of zoning analysis logic for performing a first type of zoning analysis may partition and classify the image 49 differently than a second set of zoning analysis logic for performing a second type of zoning analysis. The results of each of these sets of zoning analysis logic may superimposed resulting in an image having overlapping regions. In particular, various regions partitioned and classified by one of the sets of zoning analysis logic may overlap various regions partitioned and classified by the other set of zoning analysis logic. Some of the regions that overlap may be assigned the same data type or classification, whereas other regions that overlap may be assigned different data types of classifications. In any event, the logic 66 may bound a plurality of the overlapping regions via a bounding region and classify the bounding region based on an analysis of the overlapping regions according to the techniques described herein for the preferred embodiment.

The preferred use and operation of an exemplary embodiment of the image analyzer 25 and associated methodology are described hereafter.

For illustrative purposes, assume that image data 21 (FIG. 1) stored within the memory 23 defines the image 49 shown by FIG. 2. Note that the image data 21 may have been defined via a scan performed by the scanner 18 or may have been derived from another source (e.g., downloaded from an external system). In some situations, it may be desirable to enable the user to manipulate different portions of the image 49 as bounding boxes. In such situations, the user may submit an input for invoking the image analyzer 25, which automatically divides the image 49 into one or more bounding boxes 75-79 (FIG. 4) and classifies each bounding box 75-79 based on a statistical analysis of the type of data included in the bounding box 75-79.

Figure 6:
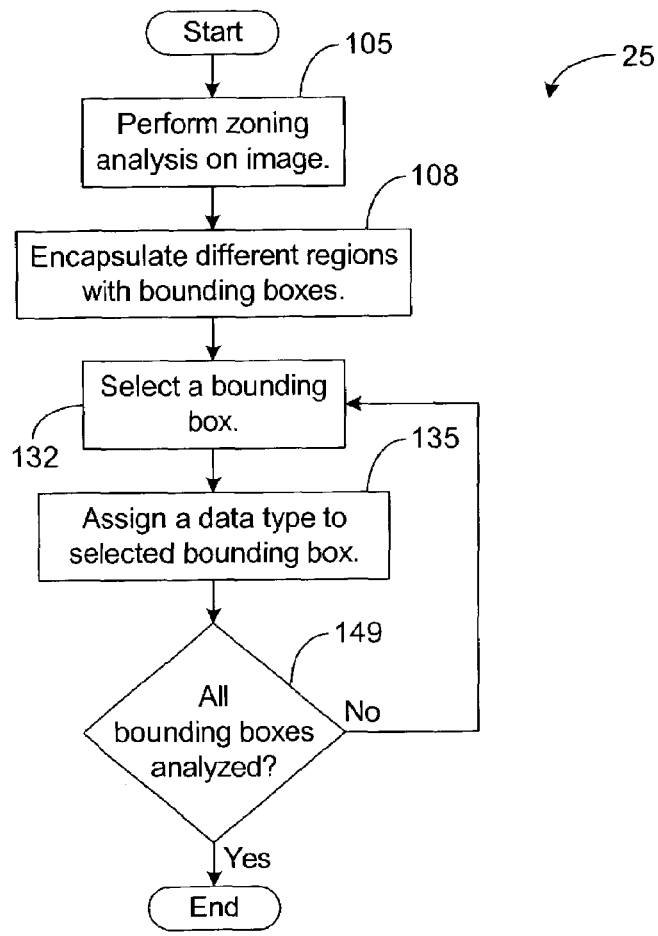
FIG. 6 is a flowchart illustrating an exemplary architecture and functionality of an image analyzer depicted in FIG. 1.

In this regard, the image analyzer 25 of the preferred embodiment first performs zoning analysis on the displayed image via any suitable known technique, as shown by block 105 of FIG. 6. In performing zoning analysis, the image analyzer 25 divides the image 49 into various regions 61-72 (FIG. 3) and assigns each region 61-72 a data type based on the type of data included in each region. Note that statistical analysis techniques, such as the techniques described hereinabove for analyzing the values of Table A, may be employed by the image analyzer 25 in dividing and/or classifying the image 49 into various regions 61-72. Then, as shown by block 108, the image analyzer 25 automatically divides the image into various bounding boxes 75-79, in which each bounding box 75-79 wholly encompasses one or more of the regions 61-72 identified in the zoning analysis performed in block 105.

Figure 7:
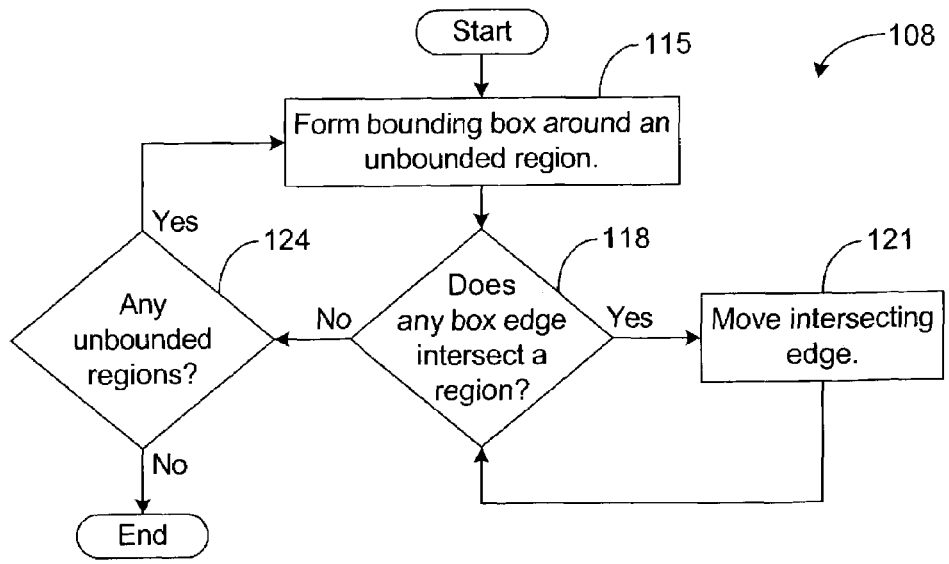
FIG. 7 is a flowchart illustrating an exemplary process for forming the bounding regions depicted in FIG. 4.

In performing block 108, each bounding box 75-79 is first formed around a region 61-72 not yet bound by another bounding box 75-79, as shown by block 115 of FIG. 7. If any of the edges of the bounding box 75-79 intersects any region 61-72, the intersecting edge is moved until the edge no longer intersects any of the regions 61-72, as shown by blocks 118 and 121. Note that movement of a bounding box edge in block 121 expands the overall area of the bounding box 71-75. Furthermore, blocks 118 and 121 are repeated until none of the bounding box edges intersect any of the regions 61-72. Once all of the regions 61-72 have been encapsulated by a bounding box 75-79, the process of encapsulating the regions 61-72 with bounding boxes 75-79 is complete, as shown by block 124 of FIG. 7.

After completing the encapsulation of the regions 61-72 with bounding boxes 75-79, one of the bounding boxes 75-79 is selected for classification, as shown by block 132 of FIG. 6. For illustrative purposes, assume that bounding box 77 is selected in block 132. In block 135, which is shown in more detail in FIG. 5, the highest ranking data type (e.g., "multi-bit drawing") within the bounding box 77 is tested for disqualification via blocks 92 and 94 of FIG. 5. If the highest ranking data type is disqualified, then the next highest ranking data type (e.g., "single-bit drawing") is designated as the highest ranking data type and tested for disqualification via blocks 92 and 94 of FIG. 5.

The foregoing process of designating the next highest ranking data type as the new highest ranking data type and testing it for disqualification is repeated until the designated highest ranking data type is not disqualified. The first data type tested in blocks 92 and 94 and not disqualified is assigned to the bounding box 77, as shown by block 99. As shown by block 149 of FIG. 6, the process of selecting a bounding box 75-79 and of assigning a data type to the selected bounding box 75-79 is preferably repeated until all of the bounding boxes 75-79 have been assigned a data type by the image analyzer 25.

After information and classification of the bounding boxes 75-79, the user may manipulate one or more of the bounding boxes 75-79 via any conventional image editing process. For example, the user may utilize a conventional image editor to edit one or more parameters of a bounding box 75-79 or to create a new image defined, in part, by one or more of the bounding boxes 75-79. Note that various other types of known techniques for manipulating one or more bounding boxes 75-79 may be performed in other embodiments.

Now, therefore, the following is claimed:

1. A region bounding and classifying system, comprising:
   memory for storing a set of image data that defines a graphical image; and
   logic configured to identify a plurality of regions of different data types within the image and to bound each of the plurality of identified regions via a bounding region that forms a single object for manipulation by an application such that a single manipulation of the bounding region by the application affects each of the identified regions, the logic further configured to assign one of the data types to the bounding region based on a predefined hierarchy of the data types, wherein at least a portion of the graphical image is outside of the bounding region.

2. The system of claim 1, wherein the logic is configured to determine a value indicative of a significance of the one data type to the bounding region and to assign the one data type to the bounding region based on the value.

3. The system of claim 1, wherein the logic is configured to associate each of the data types with a priority value, the priority value based on a rank of the associated data type within the hierarchy and based on an extent that the bounding region comprises the associated data type, and wherein the logic is further configured to perform a comparison between priority values associated with the data types and to assign the one data type to the bounding region based on the comparison.

4. A region bounding and classifying system, comprising:
   memory for storing a set of image data that defines a graphical image; and
   logic configured to identify a plurality of regions of different data types within the image and to bound each of the plurality of identified regions via a bounding region, the logic further configured to assign one of the data types to the bounding region based on a predefined hierarchy of the data types, wherein the logic is configured to sum priority values associated with the data types based on the hierarchy, each of the summed priority values associated with a data type having a lower priority, as indicated by the hierarchy, than the one data type, and wherein the logic, in performing the comparison, is configured to compare the summed priority values to a priority value associated with the one data type.

5. The system of claim 1, wherein the logic is configured to automatically expand a size of the bounding region until each identified region encompassed by the bounding region wholly fits within the bounding region.

6. The system of claim 5, wherein the bounding region forms a bounding box.

7. A region bounding and classifying system, comprising:
   memory for storing a set of image data that defines a graphical image; and logic configured to identify a plurality of regions of different data types within the image and to bound each of the plurality of identified regions via a bounding region that forms a single object for manipulation by an application such that a single manipulation of the bounding region by the application affects each of the identified regions, the logic configured to perform a prioritization of the data types included in the bounding region according to a predefined hierarchy of the data types, the logic further configured to classify the bounding region based on the prioritization performed by the logic, wherein at least a portion of the graphical image is outside of the bounding region.

8. The system of claim 7, wherein the logic is configured to disqualify one of the data types from the prioritization performed by the bounding region based on a measured significance of the one data type to the bounding region.

9. The system of claim 7, wherein the logic, in performing the prioritization, is configured to associate each of the data types with a priority value, the priority value based on the rank of the associated data type within the hierarchy and based on a measured significance of the associated data type to the bounding region, and wherein the logic is further configured to perform a comparison between priority values associated with the data types and to assign the one data type to the bounding region based on the comparison.

10. The system of claim 7, wherein the logic is configured to automatically expand a size of the bounding region until each of the plurality of regions wholly fits within the bounding region.

11. The system of claim 10, wherein the bounding region forms a bounding box.

12. A region bounding and classification method, comprising:
identifying a plurality of regions of different data types within a graphical image defined by a set of image data;
bounding each of the plurality of identified regions via a bounding region that forms a single object for manipulation by an application such that a single manipulation of the bounding region by the application affects each of the identified regions, wherein at least a portion of the graphical image is outside of the bounding region;
identifying which data types are included in the bounding region;
selecting one of the identified data types based on a predefined hierarchy of the data types; and
assigning the one data type to the bounding region based on the selecting.

13. The method of claim 12, further comprising determining a value indicative of a significance of the one data type to the bounding region, wherein the selecting is based on the value.

14. The method of claim 12, further comprising:
determining a significance of each of the identified data types to the bounding region;
associating each of the identified data types with a priority value, wherein the priority value is based on a rank of the associated data type within the hierarchy and is based on the determining; and
comparing priority values associated with the identified data types,
wherein the selecting is based on the comparing.

15. A region bounding and classification method, comprising:
identifying a plurality of regions of different data types within a graphical image defined by a set of image data;
bounding each of the plurality of identified regions via a bounding region;
identifying which data types are included in the bounding region;
selecting one of the identified data types based on a predefined hierarchy of the data types;
assigning the one data type to the bounding region based on the selecting; and
summing priority values associated with the identified data types, wherein each of the summed priority values is associated with one of the data types having a lower priority, as indicated by the hierarchy, than the selected data type, and wherein the comparing performs a comparison of a sum of the summed priority values to a priority value of the selected data type.

16. The method of claim 12, further comprising automatically expanding a size of the bounding region until the bounding region encompasses each of the identified regions.

17. The method of claim 16, wherein the bounding region forms a bounding box.

18. A region bounding and classifying method, comprising:
identifying a plurality of regions of different data types within a graphical image defined by a set of image data;
bounding each of the plurality of identified regions via a bounding region that forms a single object for manipulation by an application such that a single manipulation of the bounding region by the application affects each of the identified regions, wherein at least a portion of the graphical image is outside of the bounding region;
performing a prioritization of the identified data types according to a predefined hierarchy of the data types; and
classifying the bounding region based on the prioritization.

19. The method of claim 18, further comprising:
determining a significance of each of the data types to the bounding region; and
disqualifying one of the data types from the prioritization based on the determining.

20. The method of claim 18, further comprising:
associating each of the identified data types with a priority value based on a rank of the associated data type within the hierarchy and based on a significance of the associated data type to the bounding region; and
comparing priority values associated with the identified data types via the associating,
wherein the classifying is based on the comparing.

21. The method of claim 18, further comprising automatically expanding a size of the bounding region until none of the identified regions intersect with a perimeter of the bounding region.

22. The method of claim 18, wherein the bounding region forms a bounding box.

23. The system of claim 1, wherein the application is an image editor.

24. The system of claim 1, wherein the logic is configured to display borders of the bounding region within the graphical image.

25. The system of claim 1, wherein the logic is configured to define a size of the bounding region based on the data types of the plurality of regions bound by the bounding region.

26. The method of claim 12, further comprising interfacing the object with the application subsequent to the assigning.

27. The method of claim 26, further comprising the steps of:
   manipulating the object via the application based on the one data type assigned to the bonding region; and
   displaying the manipulated object.

28. The system of claim 3, wherein the logic is configured to sum a plurality of priority values associated with the data types.

29. The system of claim 9, wherein the logic is configured to combine a plurality of priority values associated with the data types.

30. The method of claim 14, further comprising combining a plurality of priority values associated with the identified data types.

31. The method of claim 20, further comprising summing a plurality of priority values associated with the identified data types.

* * * * *

UNITED STATES PATENT AND TRADEMARK OFFICE
CERTIFICATE OF CORRECTION

PATENT NO.          : 7,254,270 B2                                         Page 1 of 1
APPLICATION NO.  : 10/191581
DATED                   : August 7, 2007
INVENTOR(S)         : Steven J. Simske It is certified that error appears in the above-identified patent and that said Letters Patent is hereby corrected as shown below:

In column 12, line 4, delete "information" and insert -- formation --, therefor.

Signed and Sealed this

Twenty-eighth Day of April, 2009

JOHN DOLL
*Acting Director of the United States Patent and Trademark Office*